(12) United States Patent
Isoda et al.

(10) Patent No.: US 7,830,313 B2
(45) Date of Patent: Nov. 9, 2010

(54) MOBILE RADIO APPARATUS WITH ENHANCED ANTENNA CHARACTERISTICS

(75) Inventors: Yutaka Isoda, Kanagawa (JP); Masanori Kubota, Kanagawa (JP); Masanori Kikuchi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 606 days.

(21) Appl. No.: 11/573,404

(22) PCT Filed: Aug. 26, 2005

(86) PCT No.: PCT/JP2005/015563
§ 371 (c)(1), (2), (4) Date: Feb. 8, 2007

(87) PCT Pub. No.: WO2006/022381
PCT Pub. Date: Feb. 3, 2006

(65) Prior Publication Data
US 2009/0224982 A1    Sep. 10, 2009

(30) Foreign Application Priority Data
Aug. 27, 2004    (JP)    .............................. 2004-248911

(51) Int. Cl.
*H01Q 1/24*    (2006.01)
(52) U.S. Cl. ...................................... 343/702; 455/90.1
(58) Field of Classification Search .................. 343/702; 455/90.1
See application file for complete search history.

(56) References Cited

U.S. PATENT DOCUMENTS 7,009,567 B2 *    3/2006    Iwai et al. .................... 343/702
7,046,204 B2 *    5/2006    Satoh et al. .................. 343/702
7,453,405 B2 *    11/2008   Nishikido et al. ........... 343/702
7,532,168 B2 *    5/2009    Nakanishi et al. ........... 343/702

(Continued)

FOREIGN PATENT DOCUMENTS

EP    1306921    5/2003

(Continued)

OTHER PUBLICATIONS

European search report dated Apr. 8, 2008.

*Primary Examiner*—HoangAnh T Le
(74) *Attorney, Agent, or Firm*—Seed IP Law Group PLLC

(57) ABSTRACT

A mobile radio apparatus using a circuit board in a cabinet as an antenna and being capable of providing a good antenna characteristic when the mobile radio apparatus is closed for entering a portable mode is provided. In a mobile radio apparatus, an upper circuit board is housed in an upper cabinet, a lower circuit board is housed in a lower cabinet, the upper and lower circuit boards and are electrically connected, an antenna section is housed in an upper part of the lower cabinet, a feeding section for supplying power to the antenna section is housed in the lower cabinet, and in a portable mode with the upper cabinet and the lower cabinet stacked on each other, the feeding section is connected to the antenna section and in a conversation mode in which the joint whole length is grown as the upper cabinet and the lower cabinet are changed in the mutual position, the feeding section is connected to the upper circuit board through the antenna section and a connection member.

12 Claims, 10 Drawing Sheets

U.S. PATENT DOCUMENTS

2005/0239416 A1* 10/2005 Shimizu .................... 455/82
2005/0239519 A1* 10/2005 Saitou et al. ............. 455/575.1

FOREIGN PATENT DOCUMENTS

| | | |
|---|---|---|
| EP | 1445821 A1 | 8/2004 |
| EP | 1538694 | 6/2005 |
| JP | 2001-156898 | 6/2001 |
| JP | 2002-335180 | 11/2002 |
| JP | 2005-295312 A | 10/2005 |

* cited by examiner

FIG. 3 (A)
FIG. 3 (B)
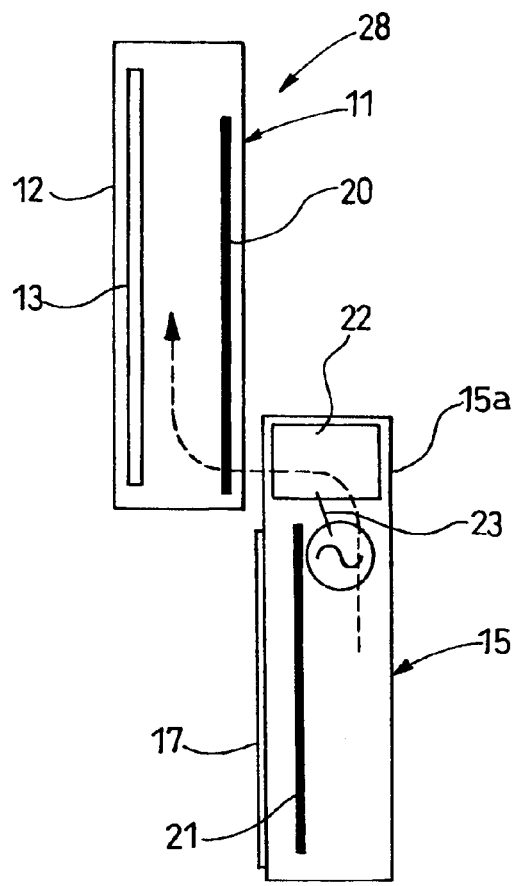
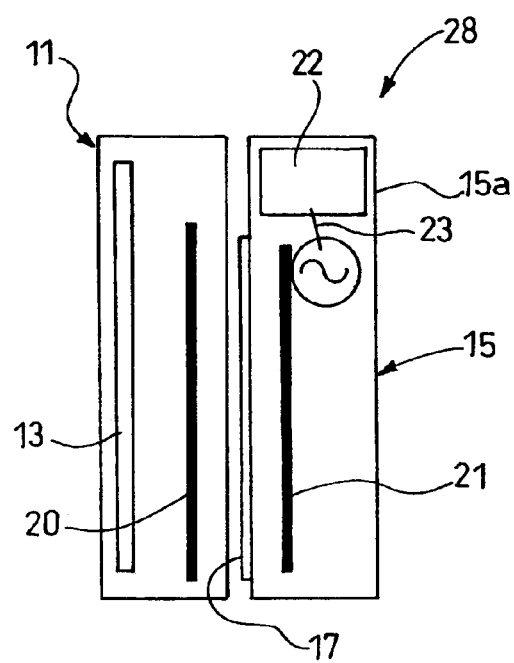

MOBILE RADIO APPARATUS WITH ENHANCED ANTENNA CHARACTERISTICS

TECHNICAL FIELD

This invention relates to a mobile radio apparatus with portability enhanced as upper and lower cabinets are folded, are slid, or are rotated for making the mobile radio apparatus compact when it is carried or is not used.

BACKGROUND ART

In recent years, a mobile telephone has been put into widespread use. Various types of mobile telephones have been developed.

Among the various types of mobile telephones, attention is focused on a folding mobile telephone whose upper and lower cabinets can be folded when the mobile telephone is carried or is not used, a compact slide type mobile telephone with portability enhanced as upper and lower cabinets are slid, a compact rotary mobile telephone with portability enhanced as upper and lower cabinets are rotated, and the like from the viewpoint of ease of use considering the portability, etc.

The folding mobile telephone, the slide type mobile telephone, and the rotary mobile telephone have each a structure to allow the mode or the form to be changed in response to the use state and therefore it is important to secure the antenna characteristic in the mode or the form.

The folding mobile telephone, the slide type mobile telephone, and the rotary mobile telephone are furthermore miniaturized and made multifunctional and particularly incorporating of an antenna to improve design is proceeding as one of the multiple functions (for example, patent documents 1 and 2).

The following first to third methods are known as a method of securing the antenna performance in both a conversation mode (at the extension time) and a portable mode (at the housing time) in the folding mobile telephone, the slide type mobile telephone, and the rotary mobile telephone:

The first method is a method of attaching an antenna to the upper end outside of an upper cabinet with the antenna exposed; this method has the following advantage:

Usually, a mobile telephone includes a liquid crystal display element (LCD) on an upper cabinet and thus when the mobile telephone is housed, the upper cabinet is positioned on the top of a lower cabinet. Therefore, if the housed mobile telephone is put on a metal substance, the upper cabinet is brought away from the metal substance.

Thus, the antenna is attached to the upper end part of the upper cabinet, so that the antenna can be brought away from the metal substance and if the mobile telephone is put on the metal substance, the antenna characteristic can be kept good.

On the other hand, the first method has the following disadvantage:

Since a face is brought close to the antenna during telephone conversation, it is difficult to suppress the specific absorption ratio (SAR) representing the average energy amount of radio waves to the reference value and the appearance is impaired because of projecting the antenna and placing slantingly, etc., to bring the antenna away from the face and the method runs counter to recent antenna incorporating.

Usually, the mobile telephone has a battery housed in the lower cabinet and therefore a wireless section is also housed in the lower cabinet. Thus, power needs to be supplied to the antenna of the upper cabinet using a coaxial line, etc., and the wiring and a break caused by bending the line introduce a problem, causing an increase in costs.

Further, in the incorporating method, when the mobile telephone is extended, the physical size of the antenna is small and thus the antenna characteristic is poor.

The second method is a method of attaching an antenna to the upper end outside of a lower cabinet with the antenna exposed; this method has the following advantage:

Since the antenna can be placed at a position distant from a face during telephone conversation, it is advantageous for securing the SAR and in the extension state, the antenna becomes a resonant element for exciting an upper cabinet and the whole mobile radio apparatus operates with the upper cabinet and the lower cabinet as a radiating element and a wide-band characteristic can be provided.

Since power can be supplied to the antenna with spring contacts from a wireless board existing in the lower cabinet, a coaxial line, etc., becomes unnecessary and simplification is made possible.

On the other hand, the second method has the following disadvantage:

Since electric current concentrates on the antenna as the radiating element, the effect of a hand and a face is large during telephone conversation and the characteristic at the telephone conversation time fluctuates largely.

When the mobile telephone is put on a metal substance, the antenna is brought close to the metal substance and it is difficult to keep the antenna characteristic good.

The third method is a method of using the board (circuit board) in a cabinet as an antenna; this method has the following advantage:

The circuit board in the cabinet is used as the antenna, so that the upper and lower circuit boards operate as a dipole antenna and the effective area of the antenna is provided large, so that a wide band and a high gain are made possible.

Since electric current does not concentrate on some elements, the effect of a hand and a face is small.

In addition, the third method is excellent in design and is preferred because it is not necessary to attach the antenna to the outside of the cabinet with the antenna exposed.

Patent document 1: JP-A-2002-335180
Patent document 2: JP-A-2001-156898

DISCLOSURE OF THE INVENTION

Problems to be Solved by the Invention

However, the third method has the following disadvantage: If the mobile telephone is placed in the portable mode, the upper circuit board incorporated in the upper cabinet and the lower circuit board incorporated in the lower cabinet overlap and the upper and lower circuit boards operate as a dipole antenna and the currents flowing into the upper and lower circuit boards cancel each other out. Thus, in the portable mode, the antenna characteristic is degraded greatly.

It is therefore an object of the invention to provide a mobile radio apparatus using a circuit board in a cabinet as an antenna and being capable of providing a good antenna characteristic when the mobile radio apparatus is closed for entering a portable mode.

Means for Solving the Problems

A mobile radio apparatus of the invention includes an upper cabinet and a lower cabinet which are connected in a stack state and can be changed in the relative position roughly stepwise, an upper circuit board and a lower circuit board being housed in the upper cabinet and the lower cabinet and electrically connected, an antenna section being housed in one of the upper cabinet and the lower cabinet, and a feeding section being housed in one of the upper cabinet and the lower cabinet for supplying power to the antenna section, wherein, in a portable mode with the upper cabinet and the lower cabinet stacked on each other, the feeding section is connected to the antenna section, and wherein, in a conversation mode in which the joint whole length is grown as the upper cabinet and the lower cabinet are changed in the mutual position, the feeding section is connected to one of the upper circuit board and the lower circuit board.

Here, the connect includes not only physical contact, but also capacity coupling. The capacity coupling is described in detail with FIG. 3.

In the slide type mobile radio apparatus having the upper cabinet and the lower cabinet which are connected in a stack state and can be changed in the relative position roughly stepwise, the antenna section is housed in one of the upper cabinet and the lower cabinet. In the portable mode, the feeding section is connected to the antenna section and good antenna characteristic is obtained.

On the other hand, in the conversation mode, the feeding section is connected to one of the upper circuit board and the lower circuit board.

The upper and lower circuit boards used as the antenna are placed in a spread state, so that the surface area of the upper and lower circuit boards is enlarged and good antenna characteristic is obtained.

Accordingly, the good antenna characteristic can be obtained in both the portable mode and the conversation mode according to the simple structure wherein the antenna section is only housed in one of the upper cabinet and the lower cabinet.

It is made possible to simplify the slide type mobile radio apparatus and it can be expected that the cost will be reduced.

A mobile radio apparatus of the invention includes an upper cabinet and a lower cabinet which are connected in a stack state, can be changed in the relative position roughly stepwise, and have each electric conductivity at least in a part thereof, an antenna section being housed in one of the upper cabinet and the lower cabinet, and a feeding section being housed in one of the upper cabinet and the lower cabinet for supplying power to the antenna section, wherein, in a portable mode with the upper cabinet and the lower cabinet stacked on each other, the feeding section is connected to the antenna section, and wherein, in a conversation mode in which the joint whole length is grown as the upper cabinet and the lower cabinet are changed in the mutual position, the feeding section is connected to one of the upper cabinet and the lower cabinet.

Here, if the whole cabinet has electric conductivity, the antenna section is shielded by the cabinet and the antenna characteristic degrades. Then, the cabinet is a member having electric conductivity at least in a part thereof, so that the antenna section is electrically exposed and other parts are formed of nonconductive resin by way of example.

In the slide type mobile radio apparatus having the upper cabinet and the lower cabinet which are connected in a stack state and can be changed in the relative position roughly stepwise, the antenna section is housed in one of the upper cabinet and the lower cabinet. In the portable mode, the feeding section is connected to the antenna section and good antenna characteristic is obtained.

On the other hand, the upper cabinet and the lower cabinet are provided with electric conductivity and in the conversation mode, the feeding section is connected to one of the upper cabinet and the lower cabinet.

The joint whole length of the upper and lower cabinets used as the antenna is grown, so that the surface area of the upper and lower cabinets is enlarged and good antenna characteristic can be obtained.

Accordingly, the good antenna characteristic can be obtained in both the portable mode and the conversation mode according to the simple structure wherein the upper cabinet and the lower cabinet are provided with electric conductivity and the antenna section is only housed in one of the upper cabinet and the lower cabinet.

It is made possible to simplify the slide type mobile radio apparatus and it can be expected that the cost will be reduced.

The mobile radio apparatus of the invention is characterized in that the upper cabinet and the lower cabinet can be slid in a direction away from each other along the same plane, the antenna section is placed on the upper side of the lower cabinet, and in the conversation mode, the feeding section is connected through the antenna section to the upper circuit board.

The antenna section is placed on the upper part of the lower cabinet, so that the distance from a wireless section in the lower board wherein a battery is placed can be shortened and the loss caused by the line on the circuit board can be decreased. In the conversation mode, the feeding section is connected through the antenna section to the upper circuit board and thus connection as direct current is not required and it can be realized by capacity coupling in a high-frequency area and the connection part can also be simplified.

The mobile radio apparatus of the invention is characterized in that the upper cabinet and the lower cabinet can be slid in a direction away from each other along the same plane, the antenna section is placed on the upper side of the upper cabinet, and in the conversation mode, the feeding section is disconnected from the antenna section and is connected to the upper circuit board.

In the conversation mode, the feeding section is connected to the upper circuit board, so that the upper and lower circuit boards operate as a dipole antenna and the antenna characteristic can be well enhanced.

In the portable mode, the feeding section is disconnected from the upper circuit board and is connected to the antenna in the upper cabinet. Accordingly, good characteristic can also be obtained in the portable mode and to place the mobile radio apparatus on a table, etc., the lower cabinet becomes downside and the upper cabinet becomes upside. Therefore, for example, if the mobile radio apparatus in the portable mode is placed on a metal substance, the upper cabinet becomes upside. As the antenna section is placed on the upper cabinet, it is made possible to bring the antenna section away from the metal substance.

Thus, when the mobile radio apparatus in the portable mode is placed on the metal substance, good antenna characteristic can also be obtained.

The mobile radio apparatus of the invention is characterized in that the upper cabinet and the lower cabinet can relatively rotate on a rotation shaft provided along the thickness direction of the upper and lower cabinets and the antenna section is placed on the rotation shaft side of the lower cabinet and in the conversation mode, the feeding section is connected through the antenna section to the upper circuit board.

The upper cabinet and the lower cabinet can rotate on the rotation shaft, so that good characteristic can be obtained as with the advantage of the slide type mobile radio apparatus in both the conversation mode and the portable mode.

The mobile radio apparatus of the invention is characterized in that the upper cabinet and the lower cabinet can relatively rotate on a rotation shaft provided along the thickness direction of the upper and lower cabinets and the antenna section is placed on the rotation shaft side of the upper cabinet and in the conversation mode, the feeding section is disconnected from the antenna section and is connected to the upper circuit board.

The upper cabinet and the lower cabinet can rotate on the rotation shaft, so that good characteristic can be obtained as with the advantage of the slide type mobile radio apparatus in both the conversation mode and the portable mode as described above.

ADVANTAGES OF THE INVENTION

The invention has the advantage that the good antenna characteristic can be obtained in both the portable mode and the conversation mode according to the simple structure wherein the antenna section is only housed in one of the upper cabinet and the lower cabinet.

BRIEF DESCRIPTION OF THE DRAWINGS

[FIG. 3] (A) is a schematic sectional view to show a state in which a mobile radio apparatus of a modified example according to the first embodiment is switched to the conversation mode and (B) is a schematic sectional view to show a state in which the mobile radio apparatus of the modified example according to the first embodiment is switched to the portable mode.

Figure 1:
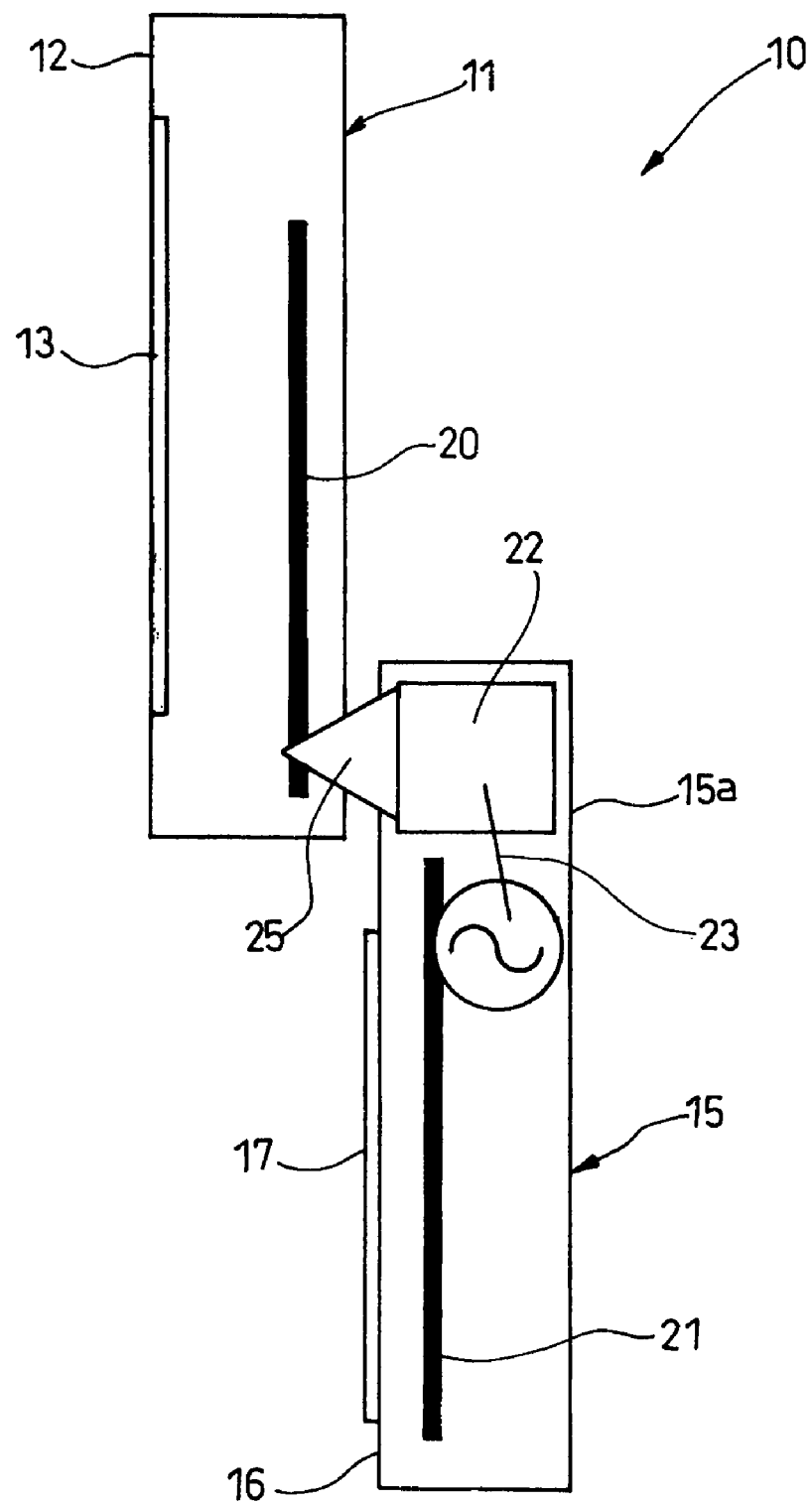
[FIG. 1] A schematic sectional view to show a state in which a mobile radio apparatus of a first embodiment according to the invention is switched to a conversation mode.

DESCRIPTION OF REFERENCE NUMERALS 10, 28, 30, 40, 50 Mobile radio apparatus
11, 41 Upper cabinet
11a Upper part in upper cabinet
15, 45 Lower cabinet
15a Upper part in lower cabinet
20 Upper circuit board
21 Lower circuit board
22, 31 Antenna section
23 Feeding section
42 Rotation shaft

BEST MODE FOR CARRYING OUT THE INVENTION

Figure 2:
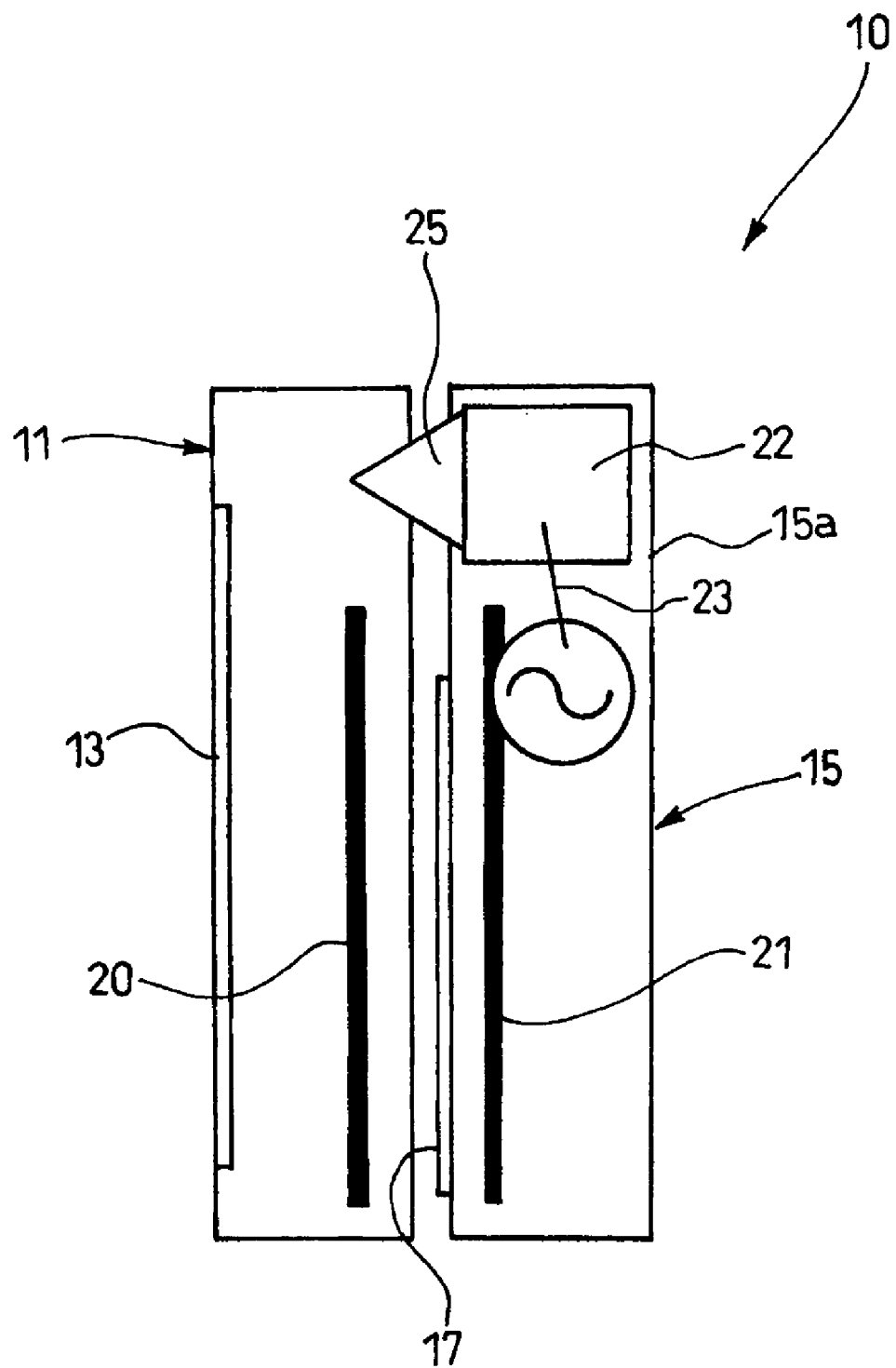
[FIG. 2] A schematic sectional view to show a state in which the mobile radio apparatus of the first embodiment according to the invention is switched to a portable mode.

As shown in FIGS. 1 and 2, a mobile radio apparatus 10 of a first embodiment is a slide type mobile radio apparatus including a liquid crystal display element (LCD) 13 on an outer cover 12 of an upper cabinet 11 and an operation key section 17 on an inner case 16 of a lower cabinet 15 wherein the upper cabinet 11 and the lower cabinet 15 are connected in a stack state and can be changed in the relative position roughly stepwise and as the upper cabinet 11 and the lower cabinet 15 are slid in a direction away from each other along the same plane from a portable mode (see FIG. 2), the portable mode can be switched to a conversation mode (see FIG. 1) with the upper cabinet 11 and the lower cabinet 15 brought away from each other.

The mobile radio apparatus 10 is configured as follows: An upper circuit board 20 is housed in the upper cabinet 11, a lower circuit board 21 is housed in the lower cabinet 15, the upper circuit board 20 and the lower circuit board 21 are electrically connected via flexible wiring (not shown), an antenna section 22 is housed in an upper part 15a of the lower cabinet 15, and a feeding section 23 for supplying power to the antenna section 22 is housed in the lower cabinet 15. In the portable mode (see FIG. 2) with the upper cabinet 11 and the lower cabinet 15 stacked on each other, the feeding section 23 is connected to the antenna section 22; in the conversation mode (see FIG. 1) in which the joint whole length is grown as the upper cabinet 11 and the lower cabinet 15 are changed in the mutual position, the feeding section 23 is connected to the upper circuit board 20 through the antenna section 22 and a connection member 25.

The connection member 25 is provided on the upper part 15a of the lower cabinet 15 and is electrically connected to the feeding section 23 through the antenna section 22.

The connection member 25 is a member with a tip projected from the inner case 16 on the upper part 15a of the lower cabinet 15 and the projected tip part extended to the inside of the upper cabinet 11 for electrically connecting to the upper circuit board 20 in the conversation mode and releasing the electric connecting to the upper circuit board 20 in the portable mode.

The antenna section 22 is placed on the upper part 15a of the lower cabinet 15, so that the liquid crystal display element 13 provided on the lower cabinet 15 can be formed largely.

In the conversation mode shown in FIG. 1, the feeding section 23 is connected to the upper circuit board 20 through the antenna section 22 and thus connection as direct current is not required and it can be realized by capacity coupling in a high-frequency area.

Next, the function of the mobile radio apparatus 10 will be discussed based on FIGS. 1 and 2.

From the portable mode shown in FIG. 2, the upper cabinet 11 and the lower cabinet 15 are slid in the direction away from each other along the same plane for bringing the upper cabinet 11 and the lower cabinet 15 away from each other, and the portable mode is switched to the conversation mode shown in FIG. 1.

As the portable mode is switched to the conversation mode, the upper and lower circuit boards 20 and 21 are placed in a spread state, so that the surface area of the upper and lower circuit boards 20 and 21 is provided largely and the feeding section 23 is connected to the upper circuit board 20 through the antenna section 22 and the connection member 25.

Since the upper circuit board 20 and the lower circuit board 21 are electrically connected, the upper and lower circuit boards 20 and 21 with the surface area provided largely can be used as an antenna.

The upper and lower circuit boards 20 and 21 with the surface area provided largely are used as the antenna, so that good antenna characteristic is obtained.

Here, the principle of using the upper and lower circuit boards 20 and 21 as the antenna will be discussed. That is, a dipole antenna of λ/2 system is provided using the upper and lower circuit boards 20 and 21 as the element.

On the other hand, from the conversation mode shown in FIG. 1, the upper cabinet 11 and the lower cabinet 15 are slid in the direction opposed to each other along the same plane for putting the upper cabinet 11 and the lower cabinet 15 on each other, and the conversation mode is switched to the portable mode shown in FIG. 2.

In this state, the feeding section 23 is connected to the antenna section 22, so that good antenna characteristic is obtained.

Accordingly, the good antenna characteristic can be obtained in both the portable mode and the conversation mode according to the simple structure wherein the antenna section 22 is only housed on the upper part 15a of the lower cabinet 15.

It is made possible to simplify the slide type mobile radio apparatus 10 and it can be expected that the cost will be reduced.

In the description of the first embodiment, the antenna section 22 and the feeding section 23 are provided in the lower cabinet 15 and in the conversation mode, are electrically connected to the upper circuit board 20 by way of example, but the invention is not limited to the mode. A similar advantage is provided if the antenna section 22 and the feeding section 23 are provided in the upper cabinet 11 and in the conversation mode, are electrically connected to the lower circuit board 21.

Next, a modified example of the mobile radio apparatus 10 of the first embodiment will be discussed based on FIGS. 3 (A) and (B). A mobile radio apparatus 28 of the modified example differs from the mobile radio apparatus 10 of the first embodiment only in that the connection member 25 is removed from the mobile radio apparatus 10 of the first embodiment. The other configuration is the same as the mobile radio apparatus 10.

According to the mobile radio apparatus 28 of the modified example, an antenna section 22 exists in an upper part 15a of a lower cabinet 15 and thus exists in a position near to a lower part 11b of an upper cabinet 11 as structure in the conversation mode (open) shown in FIG. 3 (A). An upper circuit board 20 and the antenna section 22 are near and are opposed to each other and can be capacitively coupling at the feeding time.

That is, flat portions of the upper circuit board 20 and the antenna section 22 are near and are opposed to each other. The opposed flat portions have capacity and can be replaced as a capacitor. Thus, in a high-frequency area, the opposed flat portions have low impedance and can be thought of as a conduction state.

Accordingly, the whole upper cabinet 11 operates as the upper antenna element and the characteristic equal to that of the antenna structure of the mobile radio apparatus 10 provided with the connection member 25 can be obtained.

On the other hand, in the portable mode (closed), the upper circuit board 20 is brought away from the antenna section 22 and thus capacity coupling in a high-frequency area is lost, as shown in FIG. 3 (B). That is, in the closed state, the upper circuit board 20 and the antenna section 22 are at a longer distance from each other than in the open state and are not electrically coupled at the energization time. The upper circuit board 20 and the antenna section 22 are away from each other, so that currents do not cancel each other out and good antenna characteristic is provided.

Next, second to fifth embodiments will be discussed. Parts of mobile radio apparatuses of the second to fifth embodiments identical with or similar to those of the mobile radio apparatus 10 of the first embodiment are denoted by the same reference numerals and will not be discussed again.

Second Embodiment

Figure 4:
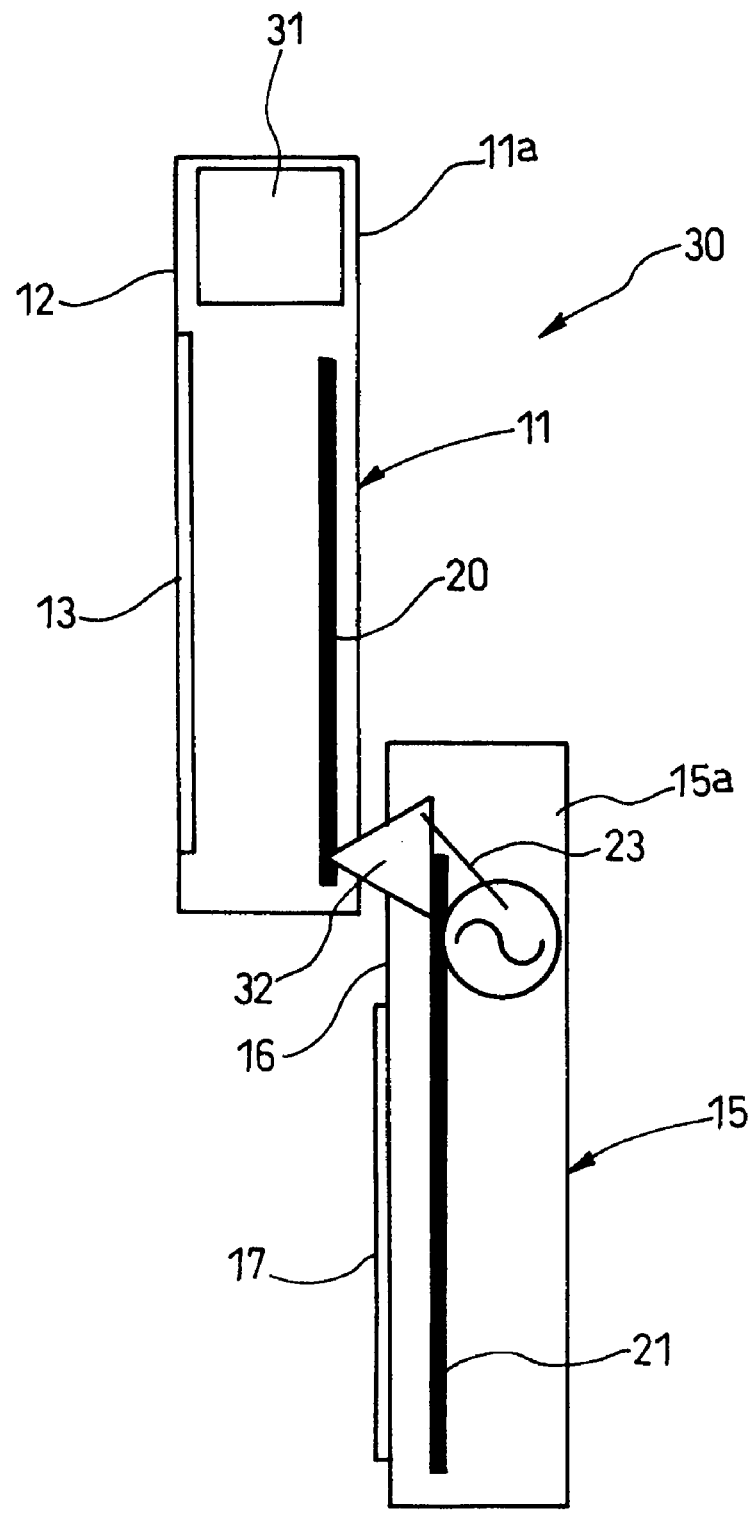
[FIG. 4] A schematic sectional view to show a state in which a mobile radio apparatus of a second embodiment according to the invention is switched to a conversation mode.
Figure 5:
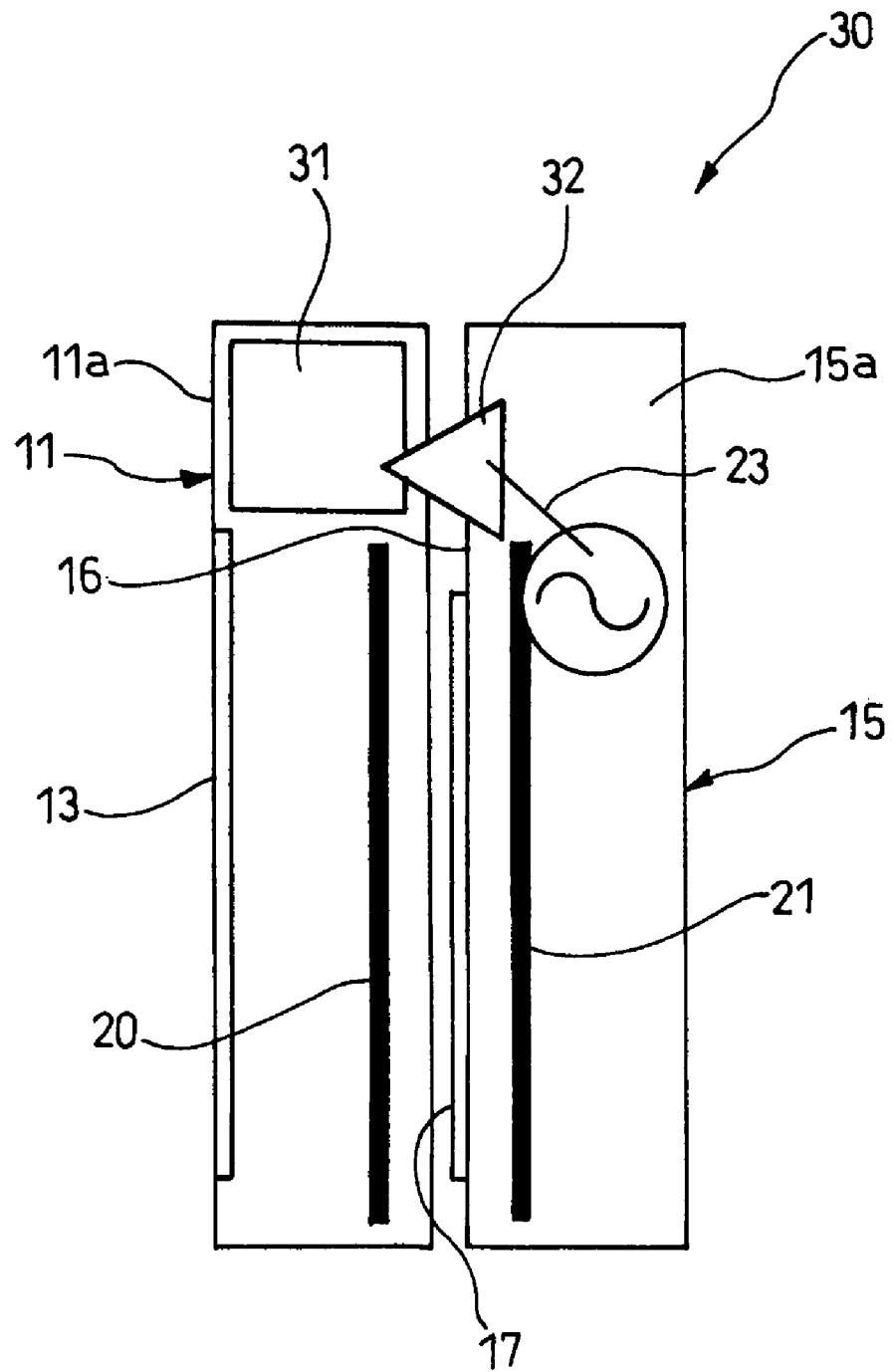
[FIG. 5] A schematic sectional view to show a state in which the mobile radio apparatus of the second embodiment according to the invention is switched to a portable mode.

As shown in FIGS. 4 and 5, a mobile radio apparatus 30 of the second embodiment is configured as follows: An upper cabinet 11 and a lower cabinet 15 can be slid in a direction away from each other along the same plane and an antenna section 31 is placed on an upper part 11a of the upper cabinet 11 and in a conversation mode (see FIG. 4), a feeding section 23 is disconnected from the antenna section 31 and is connected through a connection member 32 to an upper circuit board 20.

A connection member 32 is provided on an upper part 15a of the lower cabinet 15 and is electrically connected to the feeding section 23. The connection member 32 is a member with a tip projected from an inner case 16 on the upper part 15a of the lower cabinet 15 and the projected tip part extended to the inside of the upper cabinet 11 for electrically connecting to the upper circuit board 20 in the conversation mode and electrically connecting to the antenna section 31 in a portable mode.

Usually, to place the mobile radio apparatus 30 on a table, a desk, etc., in the portable mode or the conversation mode, the mobile radio apparatus is placed with the lower cabinet 15 downside and the upper cabinet 11 upside.

Figure 6:
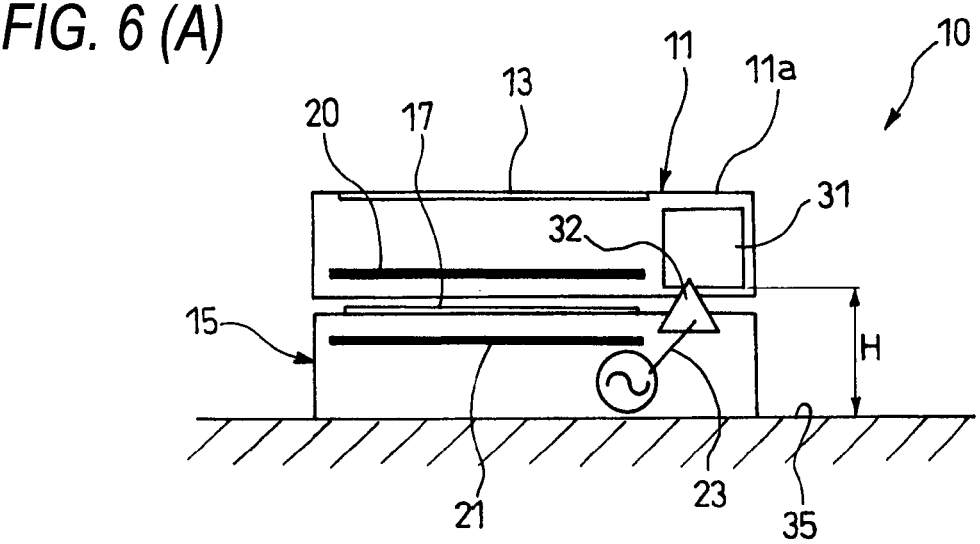
[FIG. 6] A drawing to describe a state in which the mobile radio apparatus of the second embodiment according to the invention is placed on a metal substance.
Figure 6:
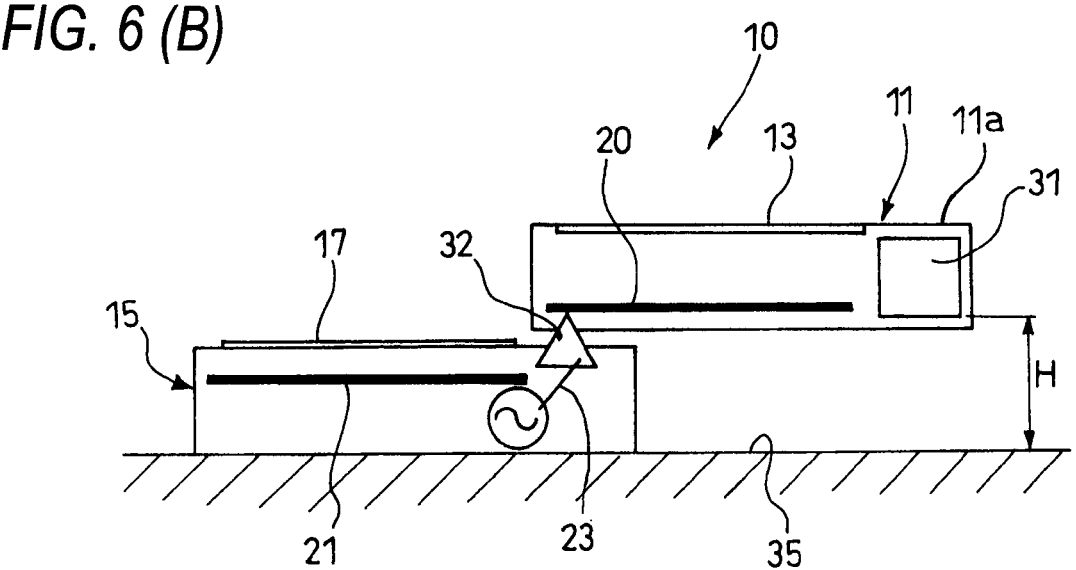

Thus, if the mobile radio apparatus 30 in the portable mode is placed on a metal substance 35, for example, the lower cabinet 15 comes in direct contact with the metal substance 35 and the upper cabinet 11 is placed at a distance from the metal substance 35, as shown in FIGS. 6(A) and (B).

The antenna section 31 is placed on the upper cabinet 11, so that it is made possible to bring the antenna section 31 away from the metal substance 35 by the distance H.

Thus, if the mobile radio apparatus 30 in the portable mode is placed on the metal substance 35, good antenna characteristic can be obtained.

In the conversation mode, the feeding section 23 is disconnected from the antenna section 31 and is connected to the upper circuit board 20 and thus upper circuit board ground and lower circuit board ground are connected as direct current (DC), so that the DC ground of the upper and lower boards are enhanced and the mobile radio apparatus becomes resistant to trouble of screen freeze, power interruption, etc., caused by static electricity received from the body of the user, leading to improvement in the quality of the product; this is an advantage.

Next, the function of the mobile radio apparatus 30 will be discussed based on FIGS. 4 and 5.

From the portable mode shown in FIG. 5, the upper cabinet 11 and the lower cabinet 15 are slid in the direction away from each other along the same plane for bringing the upper cabinet 11 and the lower cabinet 15 away from each other, and the portable mode is switched to the conversation mode shown in FIG. 4.

As the portable mode is switched to the conversation mode, upper and lower circuit boards 20 and 21 are placed in a spread boards 20 and 21 is provided largely and the feeding section state, so that the surface area of the upper and lower circuit 23 is connected to the upper circuit board 20 through the connection member 32.

Since the upper circuit board 20 and the lower circuit board 21 are electrically connected, the upper and lower circuit boards 20 and 21 with the surface area provided largely can be used as an antenna.

The upper and lower circuit boards 20 and 21 with the surface area provided largely are used as the antenna, so that good antenna characteristic is obtained.

On the other hand, from the conversation mode shown in FIG. 4, the upper cabinet 11 and the lower cabinet 15 are slid in the direction opposed to each other along the same plane for putting the upper cabinet 11 and the lower cabinet 15 on each other, and the conversation mode is switched to the portable mode shown in FIG. 5.

At this time, the feeding section 23 is connected to the antenna section 31 through the connection member 32, so that good antenna characteristic is obtained.

Accordingly, the good antenna characteristic can be obtained in both the portable mode and the conversation mode according to the simple structure wherein the antenna section 31 is only housed on the upper part 11a of the upper cabinet 11.

It is made possible to simplify the slide type mobile radio apparatus 30 and it can be expected that the cost will be reduced.

In the description of the second embodiment, the antenna section 31 is provided on the upper cabinet 11 and the feeding section 23 is provided in the lower cabinet 15 and in the conversation mode, they are electrically connected to the upper circuit board 20 by way of example, but the invention is not limited to the mode. A similar advantage is provided if the antenna section 22 is provided on the lower cabinet 15 and the feeding section 23 is provided in the upper cabinet 11 and in the conversation mode, they are electrically connected to the lower circuit board 21.

Third Embodiment

Figure 7:
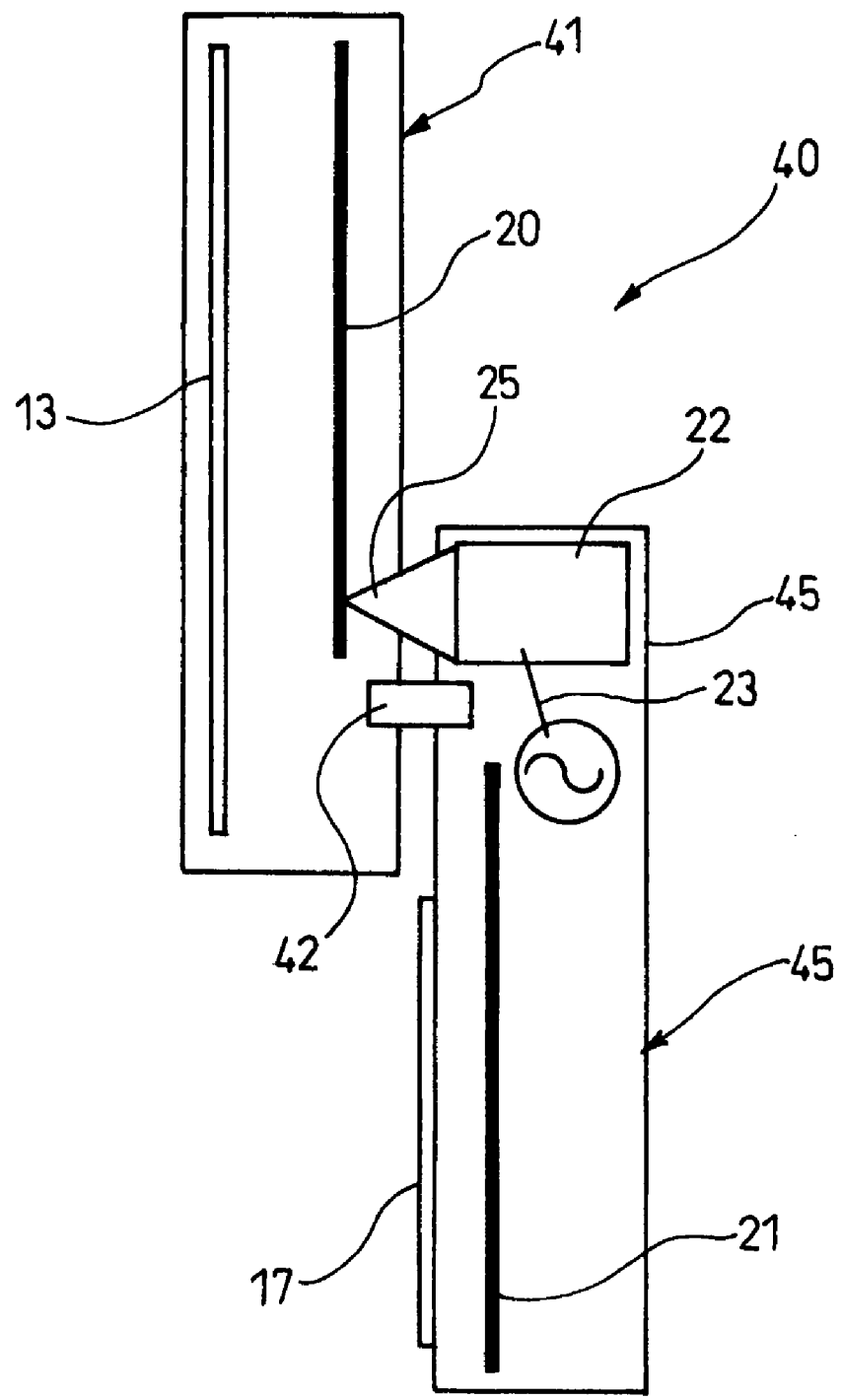
[FIG. 7] A schematic sectional view to show a state in which a mobile radio apparatus of a third embodiment according to the invention is switched to a conversation mode.
Figure 8:
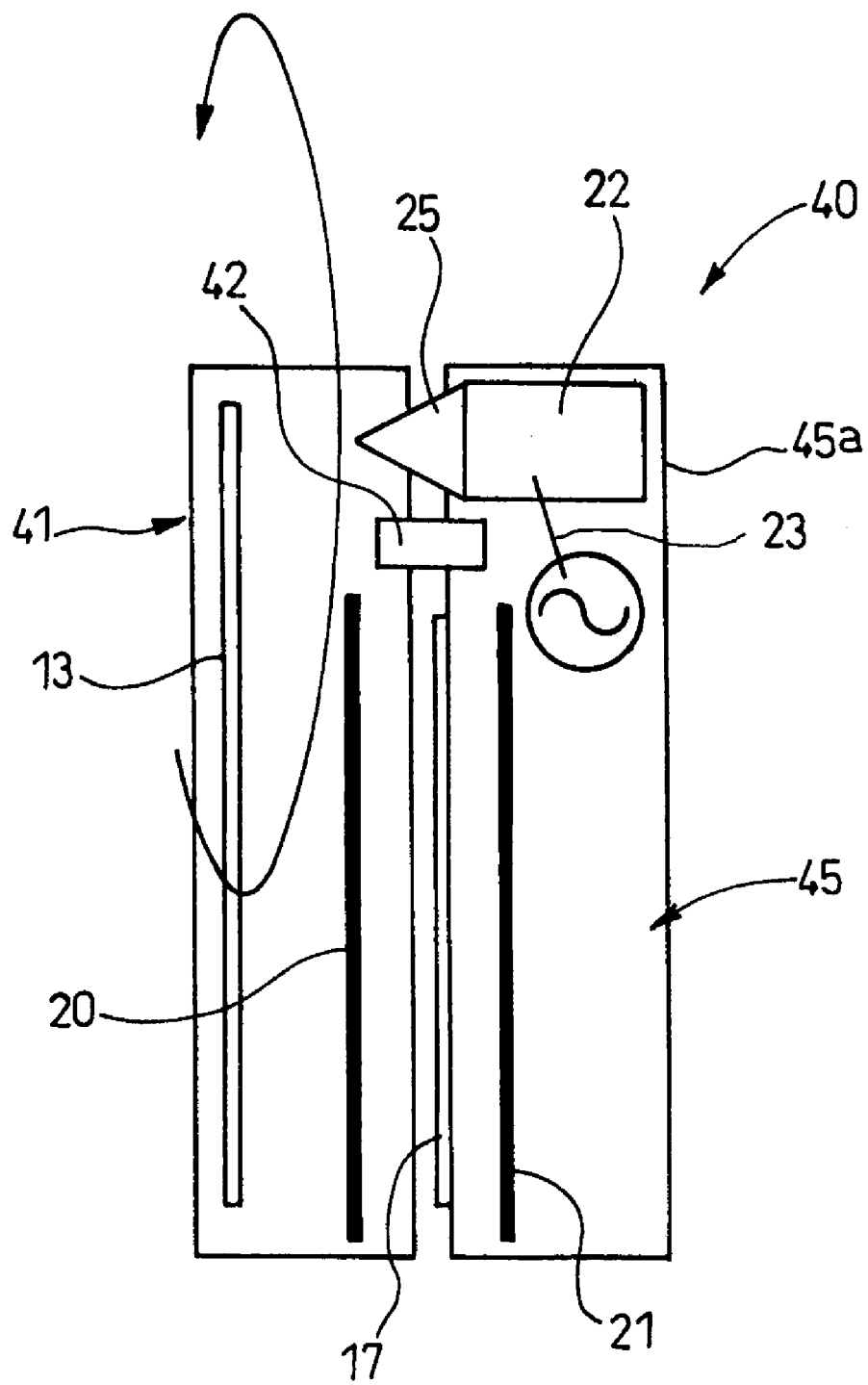
[FIG. 8] A schematic sectional view to show a state in which the mobile radio apparatus of the third embodiment according to the invention is switched to a portable mode.

As shown in FIGS. 7 and 8, a mobile radio apparatus 40 of the third embodiment is configured as follows: An upper cabinet 41 and a lower cabinet 45 can relatively rotate on a rotation shaft 42 provided along the thickness direction of the upper and lower cabinets and an antenna section 22 is placed on a rotation shaft side (part on the side of the rotation shaft 42) 45a of the lower cabinet 45 and in a conversation mode shown in FIG. 7, they are connected to an upper circuit board 20 through the antenna section 22.

Next, the function of the mobile radio apparatus 40 will be discussed.

From a portable mode shown in FIG. 8, for example, the upper cabinet 41 is rotated on the rotation shaft 42 in the arrow direction and is brought away from the lower cabinet 45 and the portable mode is switched to the conversation mode shown in FIG. 7.

The portable mode is switched to the conversation mode and upper and lower circuit boards 20 and 21 are placed in a spread state, so that the surface area of the upper and lower circuit boards 20 and 21 is provided largely and a feeding section 23 is connected to the upper circuit board 20 through the antenna section 22 and a connection member 25.

Since the upper circuit board 20 and the lower circuit board 21 are electrically connected, the upper and lower circuit boards 20 and 21 with the surface area provided largely can be used as an antenna.

The upper and lower circuit boards 20 and 21 with the surface area provided largely are used as the antenna, so that good antenna characteristic is obtained.

On the other hand, from the conversation mode shown in FIG. 7, for example, the upper cabinet 41 is rotated on the rotation shaft 42 for putting the upper cabinet 41 and the lower cabinet 45 on each other, and the conversation mode is switched to the portable mode shown in FIG. 8.

In this state, the feeding section 23 is connected to the antenna section 22, so that good antenna characteristic is obtained.

As described above, according to the mobile radio apparatus 40 of the third embodiment, the upper cabinet 41 and the lower cabinet 45 can rotate on the rotation shaft 42, so that good characteristic can be obtained as with the advantage described in the slide type mobile radio apparatus 10 of the first embodiment in both the portable mode (see FIG. 7) and the conversation mode (see FIG. 8).

The slide type mobile radio apparatus requires a long rail in the long side direction of the upper cabinet to continue the electric connection state, but in the rotary mobile radio apparatus, a rail is in the rotation direction and thus can be made small.

Further, in the slide type mobile radio apparatus, a terminal needs to be strongly pressed against the rail to reliably provide the electric connection state for a long period of time and the sliding contact resistance when the upper and lower cabinets are slid increases, but the rotary mobile radio apparatus 40 does not involve the care.

In addition, according to the rotary mobile radio apparatus 40, in switching from the portable mode to the conversation mode, the stack state of the upper and lower cabinets 41 and 45 is released from just after relative rotation of the upper cabinet 41 and the lower cabinet 45, so that it is possible to switch to a cabinet dipole just after the rotation.

In contrast, in the slide type mobile radio apparatus, parts of the upper and lower cabinets are in the stack state to the end and therefore it is necessary to switch at the slide termination time.

Fourth Embodiment

Figure 9:
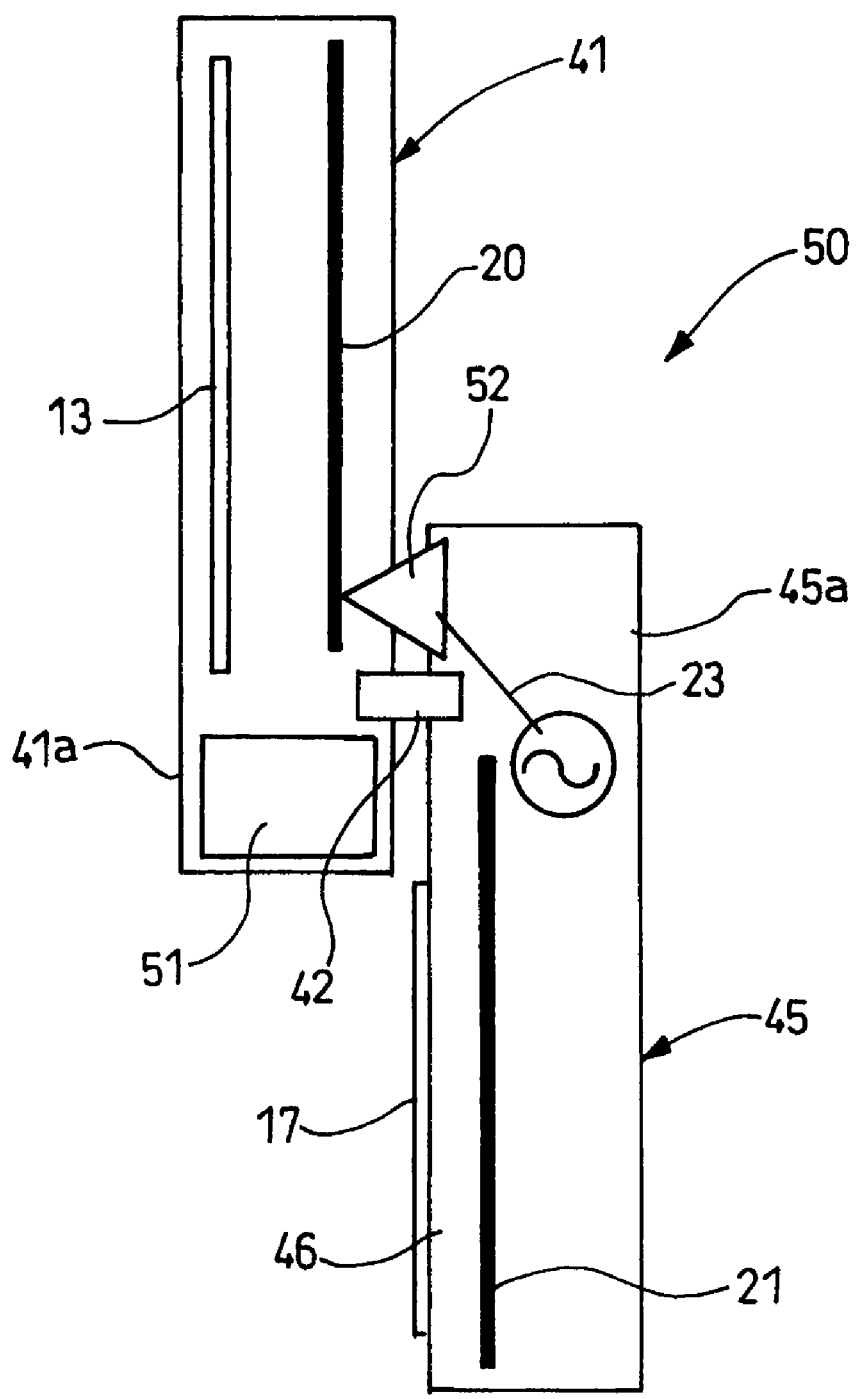
[FIG. 9] A schematic sectional view to show a state in which a mobile radio apparatus of a fourth embodiment according to the invention is switched to a conversation mode.
Figure 10:
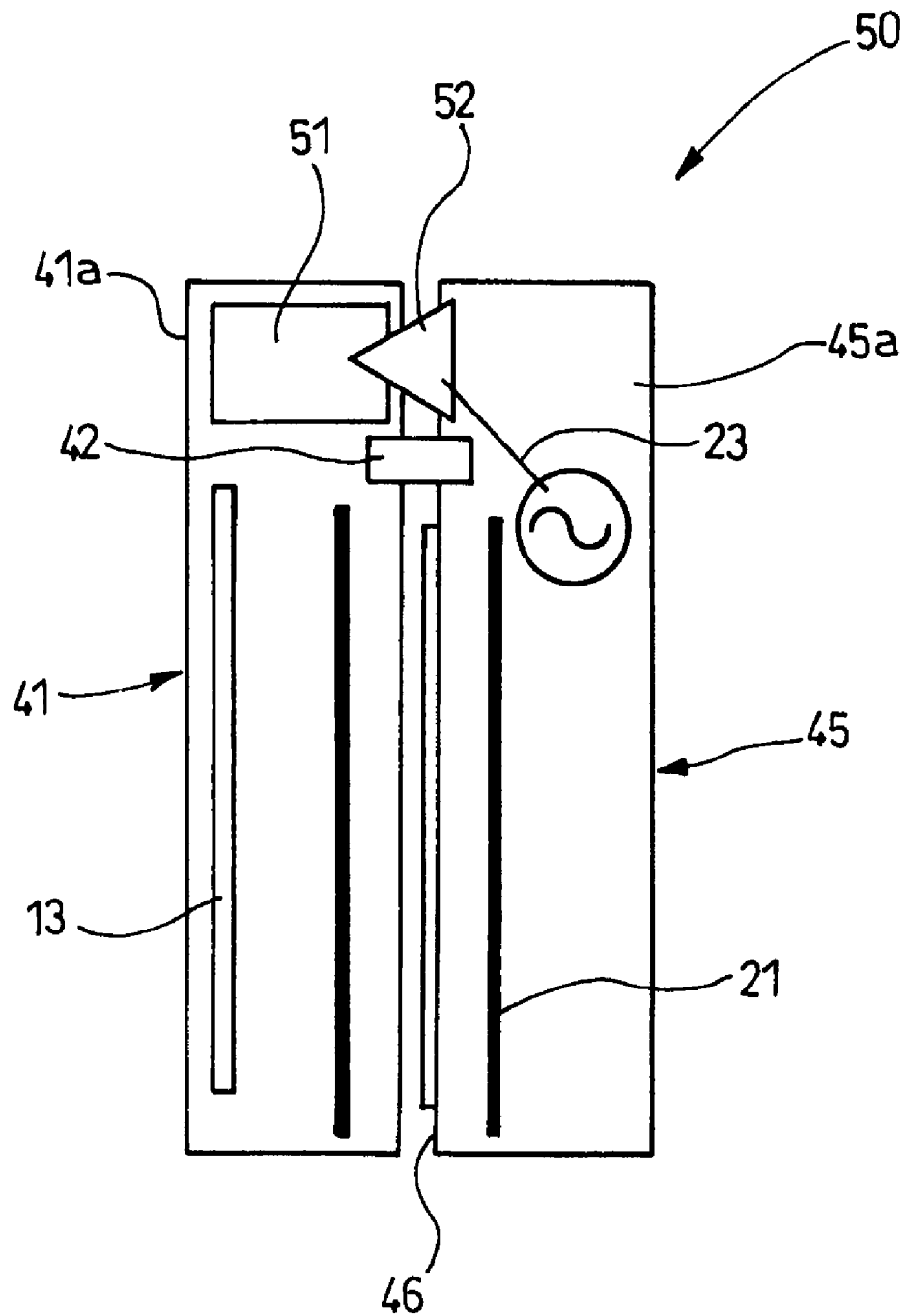
[FIG. 10] A schematic sectional view to show a state in which the mobile radio apparatus of the fourth embodiment according to the invention is switched to a portable mode.

As shown in FIGS. 9 and 10, a mobile radio apparatus 50 of the fourth embodiment is configured as follows: An upper cabinet 41 and a lower cabinet 45 can relatively rotate on a rotation shaft 42 provided along the thickness direction of the upper and lower cabinets and an antenna section 51 is placed on a rotation shaft side (part on the side of the rotation shaft 42) 41a of the upper cabinet 41 and in a conversation mode, a feeding section 23 is disconnected from the antenna section 51 and is connected to an upper circuit board 20.

A connection member 52 is provided on a rotation shaft side 45a of the lower cabinet 45 and is electrically connected to the feeding section 23. The connection member 52 is a member with a tip projected from an inner case 46 of the rotation shaft side 45a of the lower cabinet 45 and the projected tip part extended to the inside of the upper cabinet 41 for electrically connecting to the upper circuit board 20 in the conversation mode and electrically connecting to the antenna section 51 in a portable mode.

As described above, according to the mobile radio apparatus 50 of the fourth embodiment, the upper cabinet 41 and the lower cabinet 45 can rotate on the rotation shaft 42, so that good characteristic can be obtained as with the advantage described in the slide type mobile radio apparatus 40 of the third embodiment in both the portable mode (see FIG. 9) and the conversation mode (see FIG. 10).

Fifth Embodiment

A mobile radio apparatus of the fifth embodiment has upper and lower cabinets 11 and 15 in place of the upper and lower circuit boards 20 and 21 used as the antenna in the mobile radio apparatus 10 of the first embodiment.

That is, the upper and lower cabinets 11 and 15 are members each having electric conductivity at least in a part thereof and are electrically connected and in a conversation mode, the joint whole length is grown as the upper and lower cabinets 11 and 15 are changed in the mutual position, a feeding section 23 is connected to one of the upper cabinet 11 and the lower cabinet 15 and the upper cabinet 11 and the lower cabinet 15 are used as a dipole antenna.

On the other hand, in a portable mode, the feeding section 23 is connected to an antenna section 22 as in the mobile radio apparatus 10 of the first embodiment.

The reason why the cabinet is a member having electric conductivity at least in a part thereof is as follows:

If the whole cabinet has electric conductivity, the antenna section 22 is shielded by the cabinet and the antenna characteristic degrades. Then, the cabinet is a member having electric conductivity at least in a part thereof, so that the antenna section 22 is electrically exposed and other parts are formed of resin.

According to the mobile radio apparatus of the fifth embodiment, the good antenna characteristic can be obtained in both the portable mode and the conversation mode according to the simple structure wherein the antenna section 22 is only housed on an upper part 15a of the lower cabinet 15 as with the mobile radio apparatus 10 of the first embodiment.

It is made possible to simplify the slide type mobile radio apparatus 10 and it can be expected that the cost will be reduced.

The upper cabinet 11 and the lower cabinet 15 are used as a dipole antenna, so that the DC connection line between the upper and lower cabinets increases and static electricity from the user propagates not only to the upper cabinet 11, but also to the lower cabinet 15. At this time, a coil having a high inductance is inserted into lower board ground, whereby a high impedance is produced as a high frequency and the antenna characteristic is not affected. Therefore, if a zero potential part is provided in the lower cabinet 15, a liquid crystal display element 13 of the upper cabinet 11 vulnerable to static electricity can be protected.

This application is based on Japanese Patent Application (No. 2004-248911) filed on Aug. 27, 2004, which is incorporated herein by reference.

INDUSTRIAL APPLICABILITY

The invention is suited to application to a mobile radio apparatus with portability enhanced as upper and lower cabinets are folded, are slid, or are rotated for making the mobile radio apparatus compact when it is carried or is not used.

The invention claimed is:

1. A mobile radio apparatus comprising:
an upper cabinet and a lower cabinet which are connected in a closed state and can be changed to a relative position in a roughly stepwise state;
an upper circuit board and a lower circuit board which are housed in the upper cabinet and the lower cabinet respectively and electrically connected to each other;
an antenna section which is housed in the lower cabinet; and
a feeding section which is housed in the lower cabinet for supplying power to the antenna section,
wherein the upper cabinet and the lower cabinet can be slid in a direction away from each other along the same plane;
wherein a connection portion is provided at an upper portion side of the lower cabinet and is electrically connected to the feeding section through the antenna section;
wherein when the upper cabinet and the lower cabinet are in the stepwise state, the connection portion is electrically connected to the upper circuit board so that the feeding section electrically connects the upper circuit board through the antenna section and the connection portion; and
wherein when the upper cabinet and the lower cabinet are stacked on each other in the closed state, the connection portion shuts off an electrical connection between the upper circuit board and the feeding section.

2. The mobile radio apparatus according to claim 1,
wherein, in a conversation mode, the feeding section is connected through the antenna section to the upper cabinet.

3. A mobile radio apparatus comprising:
an upper cabinet and a lower cabinet which are connected in a closed state, and can be changed to a relative position thereof in a roughly stepwise state;
an upper circuit board and a lower circuit board which are housed in the upper cabinet and the lower cabinet respectively and electrically connected to each other;
an antenna section which is housed in an upper portion of the upper cabinet, the antenna section being different from the upper circuit board; and
a feeding section which is housed in the lower cabinet for supplying power to the antenna section,
wherein the upper cabinet and the lower cabinet can be slid in a direction away from each other along the same plane;
wherein a connection portion is provided at an upper portion side of the lower cabinet and is electrically connected to the feeding section;
wherein when the upper cabinet and the lower cabinet are stacked on each other in the closed state, the feeding section is electrically connected to the antenna section through the connection portion; and
wherein, when the upper cabinet and the lower cabinet are in the stepwise state, the feeding section housed in the lower cabinet is separated from the antenna section, and the feeding section is electrically connected to the upper circuit board through the connection portion.

4. The mobile radio apparatus according to claim 3,
wherein, in a conversation mode, the feeding section is disconnected from the antenna section and is connected to the upper cabinet.

5. A mobile radio apparatus comprising:
an upper cabinet and a lower cabinet which are connected in a closed state and can be changed to a relative position in a roughly stepwise state;
an upper circuit board and a lower circuit board which are housed in the upper cabinet and the lower cabinet respectively and electrically connected to each other;
an antenna section which is housed in the lower cabinet; and
a feeding section which is housed in the lower cabinet for supplying power to the antenna section, wherein the upper cabinet and the lower cabinet can relatively rotate on a rotation shaft provided along the thickness direction of the upper and lower cabinets;

wherein a connection portion is provided at an upper portion side of the lower cabinet and is electrically connected to the feeding section through the antenna section;

wherein when the upper cabinet and the lower cabinet are in the stepwise state, the connection portion is electrically connected to the upper circuit board so that the feeding section electrically connects the upper circuit board through the antenna section and the connection portion; and wherein when the upper cabinet and the lower cabinet are stacked on each other in the closed state, the connection portion shuts off an electrical connection between the upper circuit board and the feeding section.

6. The mobile radio apparatus according to claim 5, wherein, in a conversation mode, the feeding section is connected through the antenna section to the upper cabinet.

7. A mobile radio apparatus comprising:

an upper cabinet and a lower cabinet which are connected in a closed state, and can be changed to a relative position thereof in a roughly stepwise state;

an upper circuit board and a lower circuit board which are housed in the upper cabinet and the lower cabinet respectively and electrically connected to each other;

an antenna section which is arranged on a rotation shaft side in the upper cabinet, the antenna section being different from the upper circuit board; and a feeding section being housed in the lower cabinet for supplying power to the antenna section, wherein the upper cabinet and the lower cabinet can relatively rotate on the rotation shaft provided along the thickness direction of the upper and lower cabinets;

wherein a connection portion is provided at an upper portion side of the lower cabinet and is electrically connected to the feeding section;

wherein when the upper cabinet and the lower cabinet are stacked on each other in the closed state, the feeding section is electrically connected to the antenna section through the connection portion; and wherein when the upper cabinet and the lower cabinet are in the stepwise state, the feeding section housed in the lower cabinet is separated from the antenna section, and the feeding section is electrically connected to the upper circuit board through the connection portion.

8. The mobile radio apparatus according to claim 7, wherein, in a conversation mode, the feeding section is disconnected from the antenna section and is connected to the upper cabinet.

9. A mobile radio apparatus comprising:

an upper cabinet and a lower cabinet which are connected in a closed state and can be changed to a relative position in a roughly stepwise state;

an upper circuit board and a lower circuit board which are housed in the upper cabinet and the lower cabinet respectively;

an antenna section which is housed in the lower cabinet; and a feeding section which is housed in the lower cabinet for supplying power to the antenna section, wherein the upper cabinet and the lower cabinet can be slid in a direction away from each other along the same plane;

wherein a connection portion is provided at an upper portion side of the lower cabinet and is capacitively coupled to the feeding section through the antenna section;

wherein when the upper cabinet and the lower cabinet are in the stepwise state, the connection portion is capacitively coupled to the upper circuit board so that the feeding section capacitively couples the upper circuit board through the antenna section and the connection portion; and wherein when the upper cabinet and the lower cabinet are stacked on each other in the closed state, the connection portion shuts off a capacitive connection between the upper circuit board and the feeding section.

10. A mobile radio apparatus comprising:

an upper cabinet and a lower cabinet which are connected in a closed state, and can be changed to a relative position thereof in a roughly stepwise state;

an upper circuit board and a lower circuit board which are housed in the upper cabinet and the lower cabinet respectively;

an antenna section which is housed in an upper portion of the upper cabinet, the antenna section being different from the upper circuit board; and a feeding section which is housed in the lower cabinet for supplying power to the antenna section, wherein the upper cabinet and the lower cabinet can be slid in a direction away from each other along the same plane;

wherein a connection portion is provided at an upper portion side of the lower cabinet and is capacitively coupled to the feeding section;

wherein when the upper cabinet and the lower cabinet are stacked on each other in the closed state, the feeding section is capacitively coupled to the antenna section through the connection portion; and wherein, when the upper cabinet and the lower cabinet are in the stepwise state, the feeding section housed in the lower cabinet is separated from the antenna section, and the feeding section is capacitively coupled to the upper circuit board through the connection portion.

11. A mobile radio apparatus comprising:

an upper cabinet and a lower cabinet which are connected in a closed state and can be changed to a relative position in a roughly stepwise state;

an upper circuit board and a lower circuit board which are housed in the upper cabinet and the lower cabinet respectively;

an antenna section which is housed in the lower cabinet; and a feeding section which is housed in the lower cabinet for supplying power to the antenna section, wherein the upper cabinet and the lower cabinet can relatively rotate on a rotation shaft provided along the thickness direction of the upper and lower cabinets;

wherein a connection portion is provided at an upper portion side of the lower cabinet and is capacitively coupled to the feeding section through the antenna section;

wherein when the upper cabinet and the lower cabinet are in the stepwise state, the connection portion is capacitively coupled to the upper circuit board so that the feeding section capacitively couples the upper circuit board through the antenna section and the connection portion; and wherein when the upper cabinet and the lower cabinet are stacked on each other in the closed state, the connection portion shuts off a capacitive connection between the upper circuit board and the feeding section.

12. A mobile radio apparatus comprising:

an upper cabinet and a lower cabinet which are connected in a closed state, and can be changed to a relative position thereof in a roughly stepwise state;

an upper circuit board and a lower circuit board which are housed in the upper cabinet and the lower cabinet respectively;

an antenna section which is arranged on a rotation shaft side in the upper cabinet, the antenna section being different from the upper circuit board; and a feeding section being housed in the lower cabinet for supplying power to the antenna section, wherein the upper cabinet and the lower cabinet can relatively rotate on the rotation shaft provided along the thickness direction of the upper and lower cabinets;

wherein a connection portion is provided at an upper portion side of the lower cabinet and is capacitively coupled to the feeding section;

wherein when the upper cabinet and the lower cabinet are stacked on each other in the closed state, the feeding section is capacitively coupled to the antenna section through the connection portion; and wherein when the upper cabinet and the lower cabinet are in the stepwise state, the feeding section housed in the lower cabinet is separated from the antenna section, and the feeding section is capacitively coupled to the upper circuit board through the connection portion.

* * * * *